(12) United States Patent
Chillar et al.

(10) Patent No.: US 8,043,413 B2
(45) Date of Patent: Oct. 25, 2011

(54) SYSTEM AND METHOD FOR REMOVING A FOREIGN OBJECT FROM AN AIRSTREAM ENTERING A TURBOMACHINE

(75) Inventors: Rahul J. Chillar, Marietta, GA (US); Stephen D. Hiner, Salisbury (GB); Aaron M. Smith, Smyrna, GA (US)

(73) Assignee: General Electric Company, Schenectady, NY (US)

( * ) Notice: Subject to any disclaimer, the term of this patent is extended or adjusted under 35 U.S.C. 154(b) by 542 days.

(21) Appl. No.: 12/341,101

(22) Filed: Dec. 22, 2008

(65) Prior Publication Data

US 2010/0154631 A1 Jun. 24, 2010

(51) Int. Cl.
*B03C 3/08* (2006.01)
*B03C 3/78* (2006.01)

(52) U.S. Cl. ........... 95/75; 60/275; 95/78; 95/79; 96/44; 96/50; 96/62; 96/87; 96/96

(58) Field of Classification Search ............... 95/75, 78, 95/79; 96/43, 44, 48, 50, 60, 62, 63, 79, 96/86, 87, 96; 60/275
See application file for complete search history.

(56) References Cited

U.S. PATENT DOCUMENTS

| | | | | |
|---|---|---|---|---|
| 4,355,504 A | * | 10/1982 | Liu et al. | 60/275 |
| 4,784,835 A | * | 11/1988 | Fritz | 422/170 |
| 4,823,549 A | * | 4/1989 | Moser | 60/275 |
| 5,540,755 A | * | 7/1996 | Spokoyny et al. | 95/3 |
| 5,698,012 A | * | 12/1997 | Yoshikawa | 96/47 |
| 6,185,934 B1 | * | 2/2001 | Teboul | 60/297 |
| 6,514,324 B1 | | 2/2003 | Chapman | |
| 6,527,821 B2 | * | 3/2003 | Liu et al. | 55/385.3 |
| 6,527,829 B1 | * | 3/2003 | Malkamaki et al. | 95/71 |
| 6,773,488 B2 | | 8/2004 | Potter | |
| 6,926,758 B2 | | 8/2005 | Truce | |
| 7,311,752 B2 | | 12/2007 | Tepper et al. | |
| 7,356,987 B2 | * | 4/2008 | Kiser et al. | 60/278 |
| 7,445,757 B2 | * | 11/2008 | Autin et al. | 422/186.04 |
| 7,527,674 B1 | * | 5/2009 | Janawitz et al. | 96/57 |
| 7,625,435 B2 | * | 12/2009 | Dooley | 96/50 |
| 2008/0078291 A1 | * | 4/2008 | Daukant | 95/69 |
| 2009/0165439 A1 | * | 7/2009 | Hoshi et al. | 60/275 |
| 2010/0154631 A1 | * | 6/2010 | Chillar et al. | 95/63 |

FOREIGN PATENT DOCUMENTS

| | | | | | |
|---|---|---|---|---|---|
| JP | 53-122985 A | * | 10/1978 | | 96/60 |
| JP | 56-12011 A | * | 2/1981 | | 60/275 |

* cited by examiner

*Primary Examiner* — Richard L Chiesa
(74) *Attorney, Agent, or Firm* — Dale J. Davis; Ernest G. Cusick; Frank A. Landgraff

(57) ABSTRACT

An embodiment of the present invention provides a system for removing foreign objects from the airstream entering an inlet system of a turbomachine. The system may include an electrostatic system that may be configured to charge conductive, or partially conductive foreign objects that are in the airstream flowing through the system. This system may create an electric field to draw the charged foreign objects, allowing for a collecting section to remove the charged foreign objects from the airstream. An embodiment of the present invention may provide an automatic accumulation system for collecting the foreign objects removed from the airstream. An embodiment of the present invention may provide an automatic cleaning system for cleaning components of the collecting system.

18 Claims, 2 Drawing Sheets

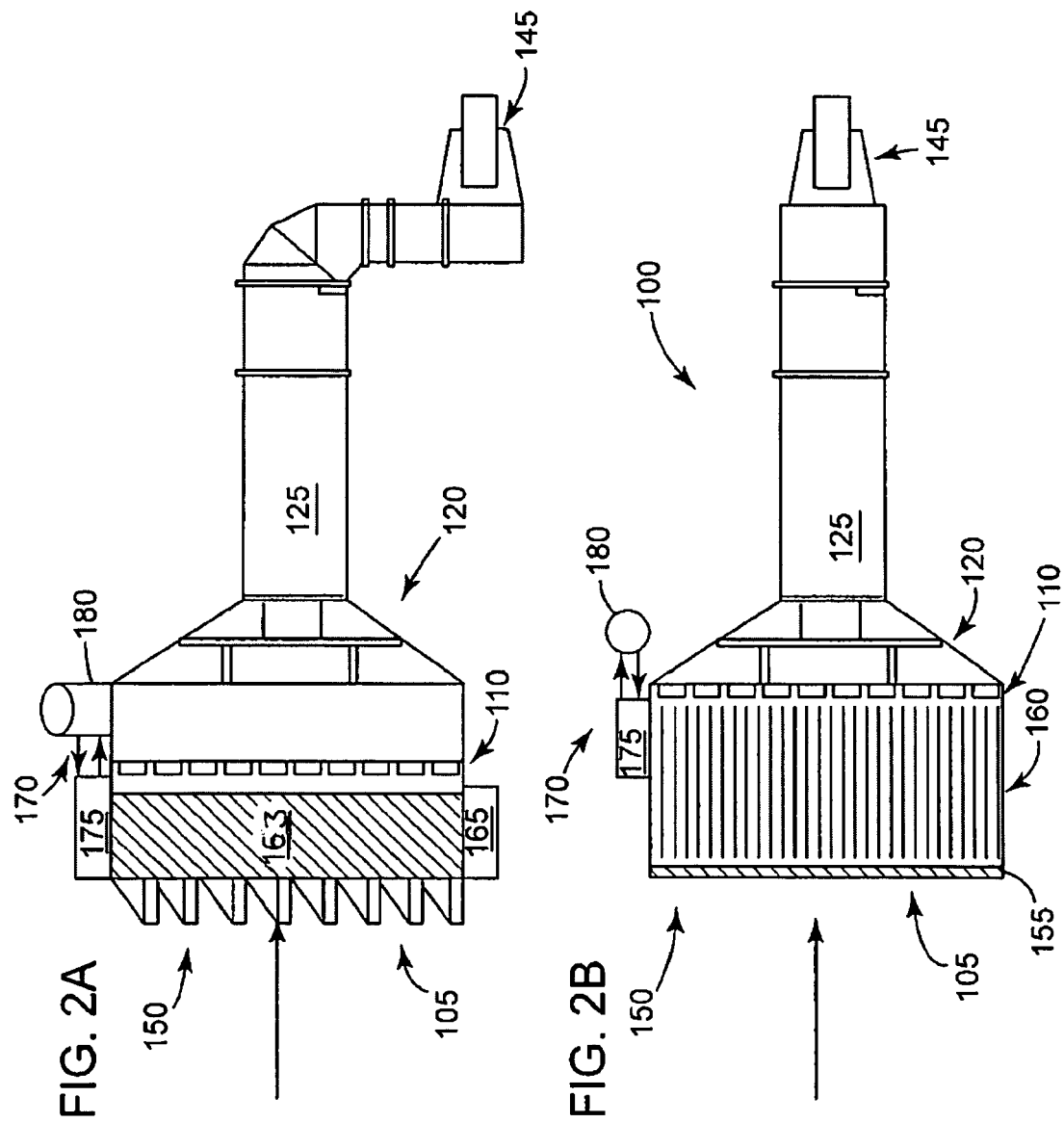

SYSTEM AND METHOD FOR REMOVING A FOREIGN OBJECT FROM AN AIRSTREAM ENTERING A TURBOMACHINE

BACKGROUND OF THE INVENTION

The present invention relates generally to the inlet system of a turbomachine; and more particularly to a system and method of removing foreign objects from the airstream entering the inlet system.

Some turbomachines, such as, but not limiting of, gas turbines, and aero-derivatives, have an air inlet system that channels the incoming airstream towards a compressor. The inlet system usually has a filter section, which screens the airstream of foreign objects and other undesired materials. Typically, the filter section comprises a plurality of static filters made of a reinforced paper media. Foreign objects within the airstream, such as, but not limiting of, dirt, debris, and other unwanted items, tend to accumulate on these filters.

There are a few concerns with the described method of removing foreign objects from the airstream. The accumulation of foreign objects on the filters increases the pressure drop across the inlet system, leading to a decrease in the efficiency of the compressor of the turbomachine. Furthermore, the filters eventually need to be replaced, which can not occur while the turbomachine is operating.

For the foregoing reasons, there is a need for a system and method of removing the foreign objects within the airstream entering the inlet system of the turbomachine. The system and method should provide a filter system that may be cleaned while the turbomachine operates. The system and method should reduce the pressure drop associated with a filter that becomes dirty or clogged with foreign objects.

BRIEF DESCRIPTION OF THE INVENTION

In an embodiment of the present invention, a filter system for an inlet system of a turbomachine, the system comprising: a turbomachine comprising an inlet system for receiving and channeling an airstream towards a compressor of the turbomachine; wherein the inlet system comprises: a weather hood and an inlet filter section; and an electrostatic system configured for removing foreign objects from the airstream, wherein the electrostatic system charges conductive or partially conductive foreign objects within an airstream flowing within the inlet system, wherein the electrostatic system comprises: at least one collecting section for collecting the foreign objects, wherein the at least one collection section creates an electric field between at least one plate set, wherein the at least one plate set comprises a charged plate and a grounded plate.

In an alternate embodiment of the present invention, a method of filter an airstream entering an inlet section of a turbomachine, the method comprising: providing a turbomachine, wherein the turbomachine comprises an inlet system for receiving and channeling an airstream towards a compressor of the turbomachine; wherein the inlet system comprises: a weather hood and an inlet filter section, utilizing an electrostatic system configured for removing foreign objects from the airstream, wherein the electrostatic system performs the steps of: utilizing an electrostatic system configured for removing foreign objects from the airstream, wherein the electrostatic system charges conductive or partially conductive foreign objects within an airstream flowing within the inlet system, wherein the electrostatic system comprises: at least one collecting section for collecting the foreign objects, wherein the at least one collection section creates an electric field between at least one plate set, wherein the at least one plate set comprises a charged plate and a grounded plate.

BRIEF DESCRIPTION OF THE DRAWINGS

These and other features, aspects, and advantages of the present invention will become better understood when the following detailed description is read with reference to the accompanying drawings in which like characters represent like elements throughout the drawings.

FIGS. 2A and 2B, collectively FIG. 2, is a schematic illustrating an electrostatic filtration system, in accordance with an embodiment of the present invention.

DETAILED DESCRIPTION OF THE INVENTION

Figure 1:
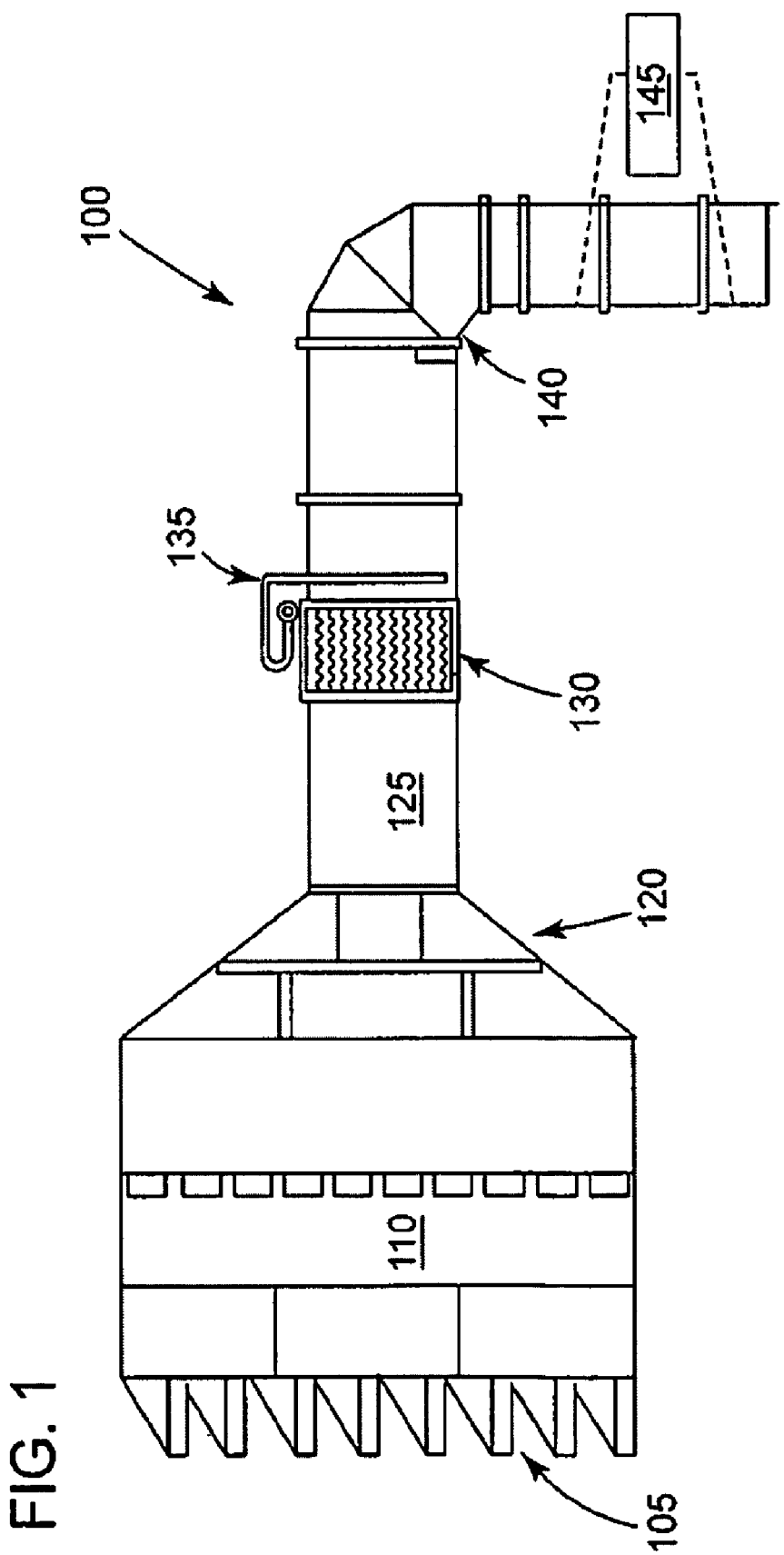
FIG. 1 is a schematic illustrating an environment where an embodiment of the present invention may operate.

The following detailed description of preferred embodiments refers to the accompanying drawings, which illustrate specific embodiments of the invention. Other embodiments having different structures and operations do not depart from the scope of the present invention.

Certain technology is used herein for the convenience of the reader only and is not to be taken as a limitation on the scope of the invention. For example, words such as "upper", "lower", "left", "right", "front", "rear", "top", "bottom", "horizontal", "vertical", "upstream", "downstream", "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

An embodiment of the present invention provides a system for removing foreign objects from the airstream entering an inlet system of a turbomachine. This system may include an electrostatic system that may be configured to charge conductive, or partially conductive foreign objects that are in the airstream flowing through the system. This system may create an electric field to draw the charged foreign objects, allowing for a collecting section to remove the charged foreign objects from the airstream.

An embodiment of the present invention may provide an automatic accumulation system for collecting the foreign objects removed from the airstream. An embodiment of the present invention may provide an automatic cleaning system for cleaning components of the collecting section.

Referring now to the Figures, where the various numbers represent like elements throughout the several views, FIG. 1 is a schematic illustrating an environment where an embodiment of the present invention may operate. FIG. 1 illustrates an inlet system 100 that is typically integrated with a compressor 145 of a turbomachine (not illustrated). The following description provides an overview of a typically configuration of an inlet system 100; the present invention may be used with other configurations of the inlet system 100, which are not illustrated in the Figures.

The inlet system 100 channels the airstream drawn in by the compressor 145. The airstream usually comes from the environment in which the turbomachine operates. Initially, the airstream flows around a weather hood 105, which may prevent weather elements, such as rain, snow, etc, from entering the compressor 145. The airstream may then flow through an inlet filter section 110; which generally removes some foreign objects from the airstream. Next, the airstream may flow through a transition piece 120 and an inlet duct 125; these components may adjust the velocity and pressure of the airstream. Next, the airstream may flow through a silencer section 130. Next, the airstream may flow through an inlet bleed heat system 135, which generally increases the airstream temperature prior to entering the compressor 145. A trash screen 140, or the like, may be located downstream of the inlet duct 125 and generally serves to prevent debris from entering the compressor 145.

FIGS. 2A and 2B, collectively FIG. 2, is a schematic illustrating an electrostatic filtration system, in accordance with an embodiment of the present invention. FIG. 2A illustrates a side view of the inlet system 100, illustrated in FIG. 1, with an embodiment of the present invention installed therein. FIG. 2B illustrates a top view of the inlet system 100, illustrated in FIG. 1, with an embodiment of the present invention installed therein. In an embodiment of the present invention, the electrostatic system 150 may be used in conjunction with a inlet filter section 110, which comprises a plurality of static filters.

An embodiment of the present invention may provide an electrostatic system 150 configured for removing a portion of the foreign objects within the airstream. An embodiment of the electrostatic system 150 may comprise a multi-stage electrostatic precipitator system. Generally, an electrostatic precipitator system may be considered a system that removes foreign objects from a flowing fluid (such as an airstream) using the force of an induced electrostatic charge. An electrostatic precipitator system may be considered a highly efficient filtration system that minimally impedes the flow of the fluid, while removing particulate matter such as foreign objects from the airstream.

The electrostatic system 150 may be integrated with the aforementioned components of the inlet system 100. An embodiment of the electrostatic system 150 may comprise at least one charging section 155, at least one collecting section 160, an accumulator 165, and a cleaning system 170. The at least one charging section 155 may charge conductive or partially conductive particles within the airstream flowing within the inlet system 100. The charge may comprise a positive charge or a negative charge. The at least one collection section 160 may create an electric field between alternately negatively charged and grounded plates 163, which may then drive the charges particles to a surface of the plates 163, allowing for the at least one collection section 160 to capture the charged particles.

In an alternate embodiment of the present invention, the electrostatic system 150 may allow for enhanced filtration be only utilizing the at least one collection section 160. Here, the least one charging section 155 may not be required and may be a component of the electrostatic system 150.

An embodiment of the at least one charging section 155 may comprise the form of a plurality of ionizing wires. These wires may be affixed to a surface on the weather hood 105. Here, the surface may be positioned to allow for the airstream to engage the at least one charging section 155. Other embodiments of the at least one charging section 155 may comprise a form other than the plurality of ionizing wires. For example, but not limiting of, the at least one charging section may comprise a plurality of objects that provide an acute direction change, such as, but not limiting of, an end of a pin, a metal brush, a bar with a plurality of nails attached, or the like.

The at least one collecting section 160 may be configured to remove the charged foreign objects from the airstream. The at least one collecting section 160 may have the form of at least one plate set 163 comprising at least two plates. Here, a grounded plate 163 and a charged plate 163 may create an electric field to drive the particles to the plates 163. The plates 163 may be installed downstream of the at least one charging section 155. The plates 163 may be orientated parallel to the flow of the airstream. In an alternate embodiment of the present invention, the at least one collecting section 160 may be located upstream of the at least one charging section 155.

The at least one collecting section 160 may utilize a cascading method of collecting areas of the at least one plate set 163. This method may include energizing and de-energizing the electric field supply to the at least one collection section 16. The cascading method may provide an efficient way for the foreign objects to move towards the accumulator 165 for removal.

An embodiment of the electrostatic system 150 may comprises an accumulator 165 for collecting the foreign objects removed from the airstream. The accumulator 165 may have the form of, for example, but not limiting of, a storage container, or the like. The accumulator 165 may be integrated with the at least one collecting section 160 allowing for the foreign objects to fall or be driven into an opening of the accumulator 165. In an embodiment of the present invention, the accumulator 165 may automatically receive the foreign objects from the at least one collecting section 160. In an alternate embodiment of the present invention, the accumulator 165 may require manual operation for receiving the foreign objects. In an alternate embodiment of the present invention, the charged foreign objects may be driven into the accumulator 165 via a washing method, or the like.

An embodiment of the electrostatic system 150 may comprise a cleaning system 170 configured for cleaning the at least one collecting section 160. The cleaning system 170 may comprises a module 175 and a cleaning fluid 180. During the operation of the electrostatic system 150, some of the foreign objects may stick to the surface of the at least one plate set 163. This may decrease the effectiveness of the electrostatic system 150. The cleaning system 170 may utilize the cleaning fluid 180, such as, but not limiting of, water, detergent, or the like, to remove the foreign objects from the at least one plate 163. In an embodiment of the present invention, the module 175, may automatically determine when the at least one plate set 163 requires cleaning. Here, the cleaning system 170 may automatically operate to clean the at least one plate 163. In an embodiment of the present invention, an operator may manually operate the cleaning system 170.

In use, the airstream may flow past the weather hood 105 where the at least one charging section 155 imparts a charge thereon. Here, the charge may be a positive charge or a negative charge. Next, the airstream may flow downstream to the at least one collecting section 160. Next, the at least one plate set 163, may impart a force on the foreign objects by the application of an electric field. Next, the cascading method may vary the location of the location of the electric field on the at least one plate set 163 from top to bottom. This may draw the foreign object into the accumulator 165. The cleaning system 170 may operate as described. Here, the module 175, may detect when the at least one plate set 163 requires cleaning. Then the cleaning system 170 may utilize the cleaning fluid 180 to clean the at least one plate set 163, as described. These processes may occur while the turbomachine is in operation.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omission, additions and equivalents as may be included within the spirit and scope of the invention as defined by the following claims.

What is claimed is:

1. A filter system for an inlet system of a turbomachine, the system comprising:
   a turbomachine comprising an inlet system for receiving and channeling an airstream towards a compressor of the turbomachine; wherein the inlet system comprises: a weather hood and an inlet filter section; and
   an electrostatic system configured for removing foreign objects from the airstream, wherein the electrostatic system charges conductive or partially conductive foreign objects within an airstream flowing within the inlet system, wherein the electrostatic system comprises: at least one collecting section for collecting the foreign objects, wherein the at least one collecting section creates an electric field between at least one plate set, wherein the at least one plate set comprises a charged plate and a grounded plate.

2. The system of claim 1, further comprising at least one charging section for charging the conducive or partially conductive foreign objects within the airstream, wherein the at least one charging section is integrated with a surface of the weather hood, and wherein the surface allows for the airstream to engage the at least one charging section.

3. The system of claim 2, wherein the at least one charging section comprises a plurality of ionizer wires.

4. The system of claim 1, wherein the inlet system comprises a plurality of static filters located downstream of the at least one collecting section.

5. The system of claim 1, wherein at least one collecting section utilizes a cascading method of applying the electric field to attract the foreign objects allowing for the foreign objects to exit from the airstream.

6. The system of claim 5, wherein the electrostatic system comprises an accumulator configured for collecting the foreign objects exiting from the at least one collecting section.

7. The system of claim 6, wherein the at least one plate set is adapted for allowing the airstream to flow downstream.

8. The system of claim 7, wherein the at least one collecting section allows for the foreign objects to collect onto the at least one plate set.

9. The system of claim 8, wherein the electrostatic system comprises an automatic cleaning system configured for cleaning the at least one collecting section, wherein the cleaning system utilizes a cleaning fluid to remove the foreign objects from the at least one plate set.

10. The system of claim 9, wherein the cascading method comprises varying a location of the electric field on the at least one plate set, allowing for a portion of the foreign objects to move from the at least one plate set to the accumulator.

11. The system of claim 1, further comprising a static filter system downstream of the electrostatic system.

12. A method of filter an airstream entering an inlet section of a turbomachine, the method comprising:
   providing a turbomachine, wherein the turbomachine comprises an inlet system for receiving and channeling an airstream towards a compressor of the turbomachine; wherein the inlet system comprises: a weather hood and an inlet filter section,
   utilizing an electrostatic system configured for removing foreign objects from the airstream, wherein the electrostatic system charges conductive or partially conductive foreign objects within an airstream flowing within the inlet system, wherein the electrostatic system comprises: at least one collecting section for collecting the foreign objects, wherein the at least one collecting section creates an electric field between at least one plate set, wherein the at least one plate set comprises a charged plate and a grounded plate.

13. The method of claim 12, wherein the inlet system comprises a plurality of static filters located downstream of the at least one collecting section.

14. The method of claim 12, wherein at least one collecting section performs the step of utilizing a cascading method of applying the electric field to attract the foreign objects allowing for the foreign objects to exit from the airstream.

15. The method of claim 14, wherein the electrostatic system comprises an accumulator, and wherein the accumulator performs the step of collecting the foreign objects from the at least one collecting section.

16. The method of claim 15, wherein the at least one collecting section allows for the foreign objects to collect onto the at least one plate set.

17. The method of claim 15, wherein the electrostatic system comprises a cleaning system configured for performing the step of automatically cleaning the at least one collecting section, wherein the cleaning system utilizes a cleaning fluid to remove the foreign objects from the at least one plate set.

18. The method of claim 17, wherein the cascading method performs the steps of varying a location of the electric field on the at least one plate set, allowing for a portion of the foreign objects to move from the at least one plate set to the accumulator.

* * * * *